United States Patent
Martin et al.

(10) Patent No.: US 6,483,661 B1
(45) Date of Patent: Nov. 19, 2002

(54) DISC DRIVE DISC CLAMP FOR EXERTING AN EQUALIZED CLAMPING FORCE ON A DISC

(76) Inventors: Stephen Robert Martin, 1005 Honeysuckle La., Louisville, CO (US) 80027; Brenda Kaye Drake, 538 W. Ash Ct., Louisville, CO (US) 80027

(*) Notice: Subject to any disclaimer, the term of this patent is extended or adjusted under 35 U.S.C. 154(b) by 65 days.

(21) Appl. No.: 09/686,551

(22) Filed: Oct. 11, 2000

Related U.S. Application Data (63) Continuation-in-part of application No. 09/499,228, filed on Feb. 7, 2000, now Pat. No. 6,339,516.
(60) Provisional application No. 60/130,306, filed on Apr. 21, 1999, and provisional application No. 60/158,834, filed on Oct. 12, 1999.

(51) Int. Cl.[7] .................... G11B 17/02; G11B 17/038
(52) U.S. Cl. ................. 360/99.12; 360/98.08
(58) Field of Search .............. 360/98.01, 98.08, 360/99.05, 99.12; 369/264, 270, 271

(56) References Cited

U.S. PATENT DOCUMENTS

| | | | |
|---|---|---|---|
| 3,587,155 A | | 6/1971 | Packard |
| 3,913,199 A | | 10/1975 | Packard et al. |
| 4,918,545 A | * | 4/1990 | Scheffel ............... 360/98.08 |
| 5,243,481 A | | 9/1993 | Dunckley et al. ........ 360/99.08 |
| 5,267,106 A | | 11/1993 | Brue et al. ............. 360/98.08 |
| 5,295,030 A | | 3/1994 | Tafreshi ............... 360/99.12 |
| 5,333,080 A | | 7/1994 | Ridinger et al. |
| 5,457,589 A | | 10/1995 | Leuthold et al. |
| 5,490,022 A | | 2/1996 | Hoshina et al. |
| 5,528,434 A | * | 6/1996 | Bronshvatch et al. .... 360/98.08 |
| 5,550,687 A | | 8/1996 | Suzuki |
| 5,590,004 A | | 12/1996 | Boutaghou ............ 360/99.12 |
| 5,623,386 A | | 4/1997 | Sullivan |
| 5,724,208 A | | 3/1998 | Yahata |
| 5,760,999 A | | 6/1998 | Yahata |
| 5,761,002 A | | 6/1998 | Moir .................. 360/98.08 |
| 5,777,832 A | | 7/1998 | Yi et al. ............... 360/135 |
| 5,790,345 A | | 8/1998 | Alt ................... 360/98.08 |
| 5,880,906 A | | 3/1999 | Lindrose ............... 360/98.08 |
| 5,943,184 A | | 8/1999 | Kelsic et al. |
| 5,973,879 A | | 10/1999 | Raffetto et al. ......... 360/98.08 |
| 6,028,739 A | * | 2/2000 | Lindrose ............... 360/98.08 |
| 6,339,516 B1 | * | 1/2002 | Martin et al. .......... 29/603.03 |

FOREIGN PATENT DOCUMENTS

JP 9-320160 * 12/1997

\* cited by examiner

*Primary Examiner*—David L. Ometz
(74) *Attorney, Agent, or Firm*—Kirstin L. Stoll-DeBell; Merchant & Gould P.C.

(57) ABSTRACT

The performance of a leaf spring disc clamp can be enhanced by increasing the flatness of an annular contact surface while the clamp is in its fully deflected, installed position. Such a disc clamp exhibits substantially improved flatness at a minor expense in applied axial force. It has been determined that a lapping process can be used to achieve a desired level of performance without fully deflecting the clamp prior to installation in a disc pack. The performance of the disc clamp may be further enhanced by providing one or more slots within a central portion of the disc clamp and joining the slots with a central aperture in the central portion in order to more uniformly distribute the clamping force around a peripheral portion of the disc clamp and thereby improve disc flatness during disc drive operation.

12 Claims, 4 Drawing Sheets

DISC DRIVE DISC CLAMP FOR EXERTING AN EQUALIZED CLAMPING FORCE ON A DISC

RELATED APPLICATIONS

This application is a continuation-in-part of U.S. patent application Ser. No. 09/499,228, entitled "DISC DRIVE DEFLECTED DISC CLAMP LAPPING PROCESS", filed on Feb. 7, 2000, now U.S. Pat. No. 6,339,516, which claimed the benefit of priority of U.S. Provisional Patent Application Serial No. 60/130,306, entitled "DEFLECTED DISC CLAMP LAPPING PROCESS", filed Apr. 21, 1999. This continuation in part application also claims the benefit of U.S. Provisional Patent Application Serial No. 60/158,834, entitled "DISC FLATNESS FROM ID LOBES," filed on Oct. 12, 1999.

TECHNICAL FIELD

The invention relates generally to disc drives and more particularly to a lapped disc clamp used to secure a disc platter assembly to a spin motor, as well as, a process for manufacturing the lapped disc clamp and a disc clamp designed to more uniformly equalize the clamping force exerted on the disc.

BACKGROUND

Disc drives are data storage devices that store digital data in magnetic form on a rotating storage medium on a disc. Modern disc drives comprise one or more rigid discs that are typically coated with a magnetizable medium and mounted on the hub of a spin motor for rotation at a constant high speed. Information is stored on the discs in a plurality of concentric circular tracks typically by transducers ("heads") mounted to an actuator assembly for movement of the heads relative to the discs. During a write operation, data is written onto the disc track and during a read operation the head senses the data previously written on the disc track and transfers the information to the external environment. Critical to both of these operations is the accurate locating of the head over the center of the desired track.

The heads are each mounted via flexures at the ends of actuator arms that project radially outward from the actuator body or "E" block. The actuator body typically pivots about a shaft mounted to the disc drive housing adjacent the outer extreme of the discs. The pivot shaft is parallel to the axis of rotation of the spin motor and the discs, so that the heads move in a plane parallel to the surfaces of the discs.

Typically, such actuator assemblies employ a voice coil motor to position the heads with respect to the disc surfaces. The voice coil motor typically includes a flat coil mounted horizontally on the side of the actuator body opposite the actuator arms. The coil is immersed in a vertical magnetic field of a magnetic circuit comprising one or more permanent magnets and vertically spaced apart magnetically permeable pole pieces. When controlled direct current (DC) is passed through the coil, an electromagnetic field is set up which interacts with the magnetic field of the magnetic circuit to cause the coil to move in accordance with the well-known Lorentz relationship. As the coil moves, the actuator body pivots about the pivot shaft and the heads move across the disc surfaces. The actuator thus allows the head to move back and forth in an arcuate fashion between an inner radius and an outer radius of the discs.

Modern disc drives typically include one or more discs mounted to the spin motor. Spacers are used to provide the separation between discs necessary for the actuators arms to movably locate the heads in relation with the disc surfaces. The discs and spacers collectively form a disc stack assembly, or disc pack, that is mounted on the spin motor hub and held together with a leaf spring disc clamp.

Disc clamps can be either stamped or milled. While milled clamps are more rigid and less prone to deflecting the abutting disc surface, they are relatively expensive to produce. Consequently, stamped leaf spring disc clamps, which are substantially less expensive, have become popular. The clamp is typically a circular spring-steel, sheet metal structure having a central portion and a rib portion at or near the OD of the clamp, with an annular rib formed in the rim portion of the clamp. The central portion of the leaf spring disc clamp has a partial aperture that is bent or deflected toward the center of the clamp, forming a leaf spring above the level of the annular rib, and includes a plurality of screw holes spaced symmetrically about the central portion of the clamp. The screws used to mount the disc clamp springingly bend and deflect the central portion of the clamp toward the upper surface of the motor spindle as the screws are tightened, thereby forcing the annular rib into firm contact with the uppermost disc surface and applying a clamping force to the disc stack.

This type of disc clamp is not without problems. The disc clamp is secured with a plurality of screws, typically 3, circumferentially spaced around the center of the clamp. The majority of the clamping force is exerted by the rib portion adjacent the screw locations, with a somewhat reduced level of clamping force exerted by the rib portion between the screw locations. This variation in clamping force can mechanically distort the discs in a phenomenon sometimes referred to as "potato chipping," meaning that the portions of the disc nearest the clamp screws are displaced further than the portions of the disc between the screws.

One solution to "potato chipping" is to increase the number of mounting screws used to secure the disc clamp to the spin motor hub. As more screws are used and are spaced closer together, the discrepancy in clamping force is reduced but not eliminated. A disadvantage of this approach is that the use of additional screws complicates the manufacturing and assembly process.

Mechanical distortion of the disc surface can, in turn, lead to undesirable variations in the read/write signals detected and written by the heads of the disc drive. Since the heads will fly at varying heights around the circumference of the disc while attempting to follow a distorted disc, the signals used to read and write data on the discs may be inadequate to ensure reliable data storage and recovery.

SUMMARY OF THE INVENTION

Against this backdrop the present invention has been developed. The performance of a leaf spring disc clamp can be enhanced by increasing the flatness of an annular contact surface in its fully deflected, installed position. Such a disc clamp exhibits a substantially improved flatness in the installed state at a minor expense in applied axial force and thus has a more uniform force distribution applied around the annular contact surface. It has further been determined that a lapping process can be used to achieve a desired level of performance without fully deflecting the clamp prior to installation in a disc pack.

Accordingly, an aspect of the invention is found in a method of manufacturing a leaf spring disc clamp for use in a disc drive to clamp a data storage disc to a spindle hub of a spin motor. The method includes the steps of forming a piece of spring sheet metal into a generally circular leaf spring disc clamp having an annular rim portion and a central bowed leaf spring portion. The clamp is then placed on a lapping surface, and a force is applied to the central portion of the clamp to partially deflect the central portion of the clamp from an undeflected position toward the lapping surface. The clamp is then moved relative to the lapping surface to abrade and remove a portion of the rim portion to form a flattened annular contact surface on the rim portion.

Another aspect of the invention is found in a leaf spring disc clamp for fastening a data disc to a disc spin motor hub in which an annular rim portion forms an annular rib that has a flat annular contact surface thereon for uniformly distributing clamping force onto the data disc.

Yet another aspect of the present invention involves providing one or more slots within the central portion of the disc clamp and joining the slots with a central aperture in the central portion in order to more uniformly distribute the clamping force around the annular rib of the disc clamp and thereby improve disc flatness during disc drive operation.

These and other features as well as advantages that characterize the present invention will be apparent from a reading of the following detailed description and a review of the associated drawings.

DETAILED DESCRIPTION OF PREFERRED EMBODIMENTS

Figure 1:
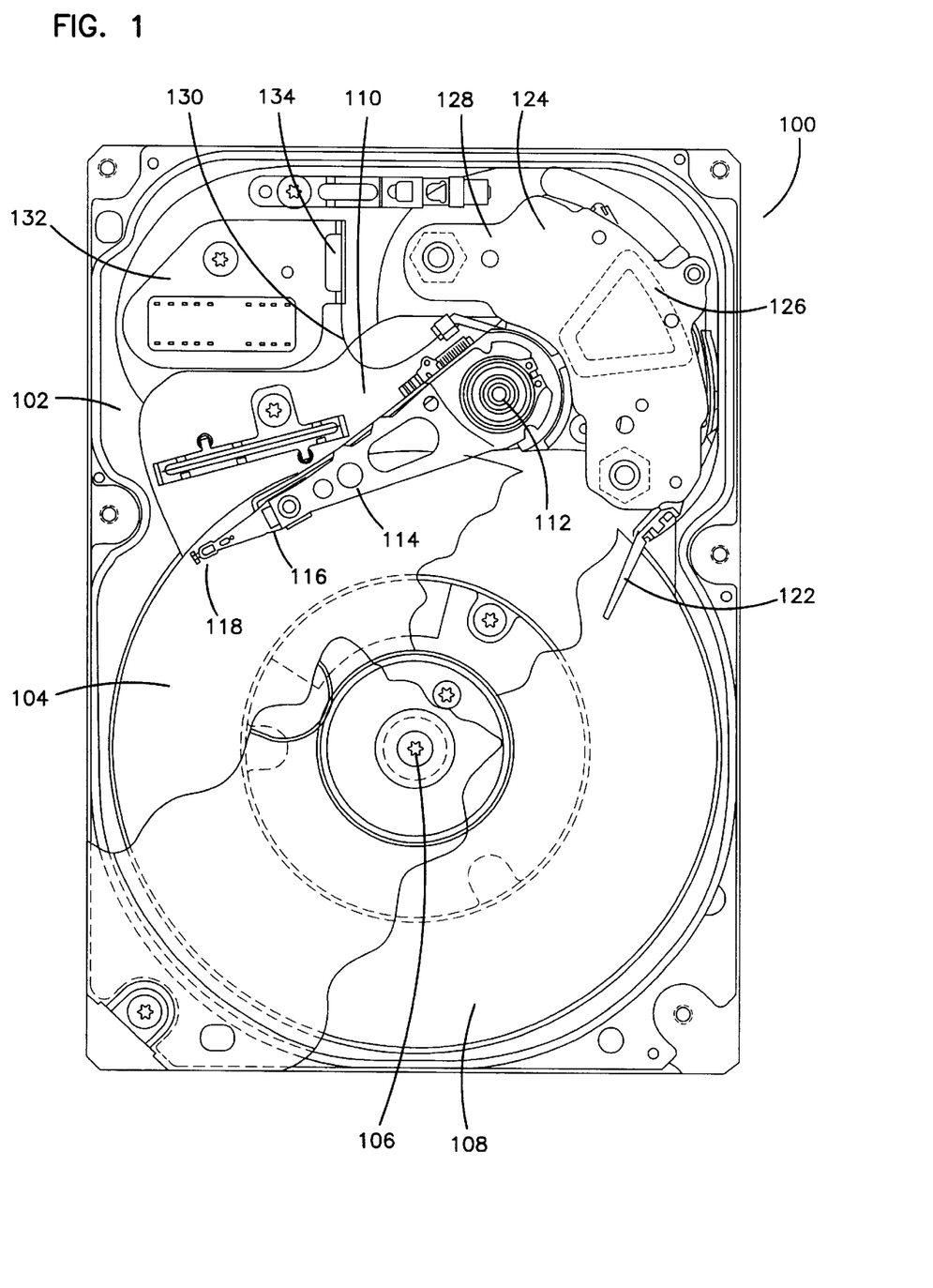
FIG. 1 is a plan view of a disc drive incorporating a spring disc clamp in accordance with a preferred embodiment of the invention with the disc drive cover partially removed.

A disc drive 100 constructed in accordance with a preferred embodiment of the present invention is shown in FIG. 1. The disc drive 100 includes a base 102 to which various components of the disc drive 100 are mounted. A top cover 104, shown partially cut away, cooperates with the base 102 to form an internal, sealed environment for the disc drive in a conventional manner. This assembly is called a head disc assembly (HDA). The components include a spin motor 106 which rotates one or more discs 108 at a constant high speed. Information is written to and read from tracks on the discs 108 through the use of an actuator assembly 110, which rotates about a bearing shaft assembly 112 positioned adjacent the discs 108.

The actuator assembly 110 includes a plurality of actuator arms 114 which extend over the surfaces of the discs 108, with one or more flexures 116 extending from each of the actuator arms 114. Mounted at the distal end of each of the flexures 116 is a head 118 which includes an air bearing slider enabling the head 118 to fly in close proximity above the corresponding surface of the associated disc 108.

The spin motor 106 is typically de-energized when the disc drive 100 is not in use for extended periods of time. The heads 118 are moved over park zones 120 near the inner diameter of the discs 108 when the drive motor is de-energized. The heads 118 are secured over the park zones through the use of an actuator latch arrangement 122, which prevents inadvertent rotation of the actuator arms 114 when the heads are parked.

The radial position of the heads 118 is controlled through the use of a voice coil motor (VCM) 124, which typically includes a coil 126 attached to the actuator assembly 110, as well as one or more permanent magnets and return plates 128 which are spaced apart and establish a vertical magnetic field between them in which the coil 126 is immersed. The controlled application of current to the coil 126 causes magnetic interaction between the permanent magnets 128 and the coil 126 so that the coil 126 moves in accordance with the well known Lorentz relationship. As the coil 126 moves, the actuator assembly 110 pivots about the bearing shaft assembly 112 and the heads 118 are caused to move across the surfaces of the discs 108.

A flex assembly 130 provides the requisite electrical connection paths for the actuator assembly 110 while allowing pivotal movement of the actuator assembly 110 during operation. The flex assembly includes a printed circuit board 132 to which head wires (not shown) are connected; the head wires being routed along the actuator arms 114 and the flexures 116 to the heads 118. The printed circuit board 132 typically includes circuitry for controlling the write currents applied to the heads 118 during a write operation and for amplifying read signals generated by the heads 118 during a read operation. The flex assembly terminates at a flex bracket 134 for communication through the base deck 102 to a disc drive printed circuit board (not shown) mounted to the bottom side of the disc drive 100.

Figure 2:
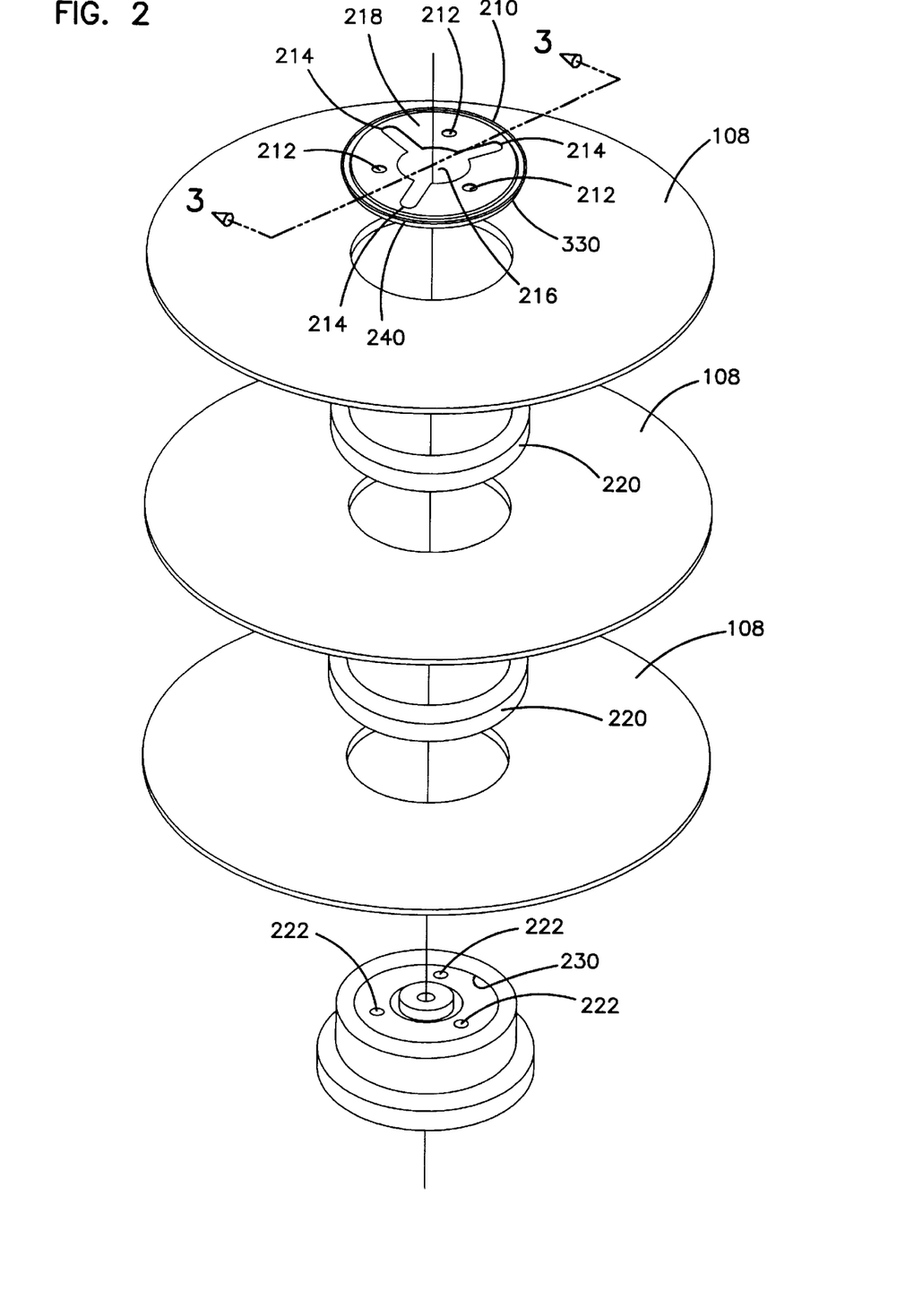
FIG. 2 is an exploded view of an exemplary disc pack assembly utilizing three leaf spring disc clamp in accordance with a preferred embodiment of the invention.
Figure 3:
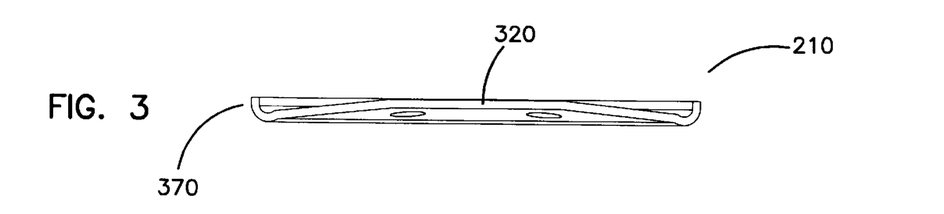
FIG. 3 is a cross sectional view taken along the line 3—3 of FIG. 2 of the disc clamp prior to lapping in accordance with a preferred embodiment of the present invention.

The discs 108 are secured to the hub 230 of a spin motor 106 in spaced-apart fashion. As illustrated in FIG. 2, three discs 108 are alternatively stacked together with spacers 220 that provide the vertical spacing necessary for actuator assembly function (described hereinafter). Any combination of discs 108 and spacers 220 can be assembled together to form a disc pack. The stacked set of discs 108 and spacers 220 are mounted to the spin motor 106 via the disc clamp 210. This combination of discs 108 and spacers 220, along with disc clamp 210 can be referred to as a disc assembly or disc pack. Preferably, three mounting screws (not shown) are used to secure disc clamp the 210 to the spin motor hub 230 using threaded bores 222 in the hub 230.

FIG. 2 shows the leaf spring disc clamp 210 according to a preferred embodiment of the present invention. The leaf spring disc clamp 210 has a bowed central leaf spring portion 218 that has a central aperture 216. The clamp 210 also has an annular rim portion 240 that forms an annular rib 330 (better seen in the sectional views of FIGS. 3–6). As described hereinafter, annular rib 330 preferably provides the contact surface between the disc clamp 210 and the upper surface of the uppermost disc 108. In the embodiment illustrated, the leaf spring disc clamp 210 has a total of three screw mounting holes 212 and three spanner slots 214. The spanner slots 214 are used for alignment during the assembly process. Without these spanner slots 214, the disc clamp 210 would simply rotate as one attempts to tighten the first mounting screw (not shown). If desired, the spanner slots 214 may be replaced with holes for receiving guide pins. It should be noted that the deflection and lapping process in accordance with a preferred embodiment of the present invention can be used just as easily with a spring clamp having any number of screw holes and can also be applied to a solid or milled clamp. The invention is described herein with particular reference to a stamped leaf spring disc clamp utilizing three screws, as exemplary, for description purposes only. The deflection and lapping process used to manufacture these clamps is illustrated in FIGS. 3–6.

Figure 4:
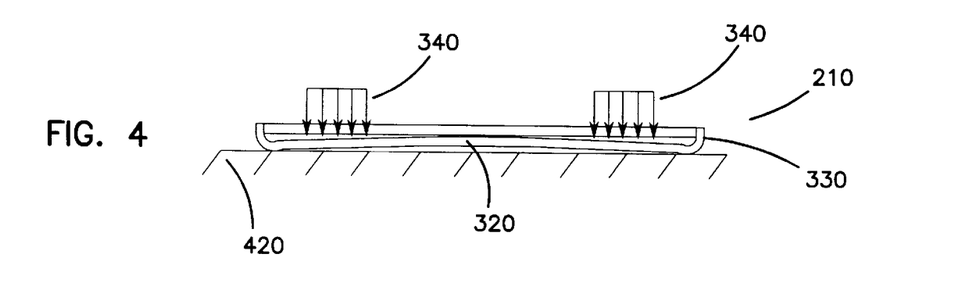
FIG. 4 is a view as in FIG. 3 showing the application of clamping force on the central portion of the clamp in the force application step in accordance with a preferred embodiment of the present invention.

A downward deflective force is applied around each screw hole location during the lapping process of the present invention. FIG. 4 illustrates the positioning of the downward or deflective force applied near each screw hole location 340. The effect of the deflective force can be seen in this figure by the position of central leaf spring portion 320 relative to lapping plane 420. Lapping plane 420 represents the working surface of a lapping station and represents a flat surface from which relative positions can be described.

Figure 5:
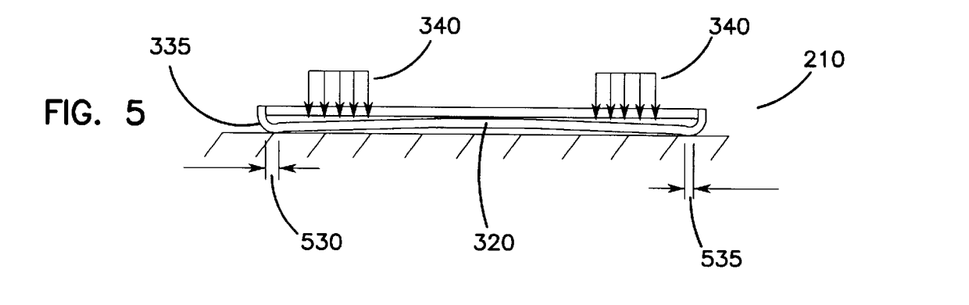
FIG. 5 is a view as in FIG. 4 showing the flattening of the annular rib during the lapping step in accordance with a preferred embodiment of the present invention.

Lapping can begin once the leaf spring disc clamp 210 has been partially deflected as seen in FIG. 4. FIG. 5 illustrates disc clamp 210 after lapping has been completed. The annular rib 330 now has an annular flat contact surface 335 that approximately corresponds to the portion of the disc clamp 210 that contacted the lapping surface. Because stamped materials can present variations in configuration, it is possible, indeed probable, that dissimilar amounts of material may be removed from the annular rib 330 in creating the annular flat contact surface 335. This is illustrated in FIG. 5, in which annular flat contact surface 335 is represented as having an uneven width. The annular flat contact surface 335 is wider, for example, at location 530 in comparison with location 535.

Figure 6:
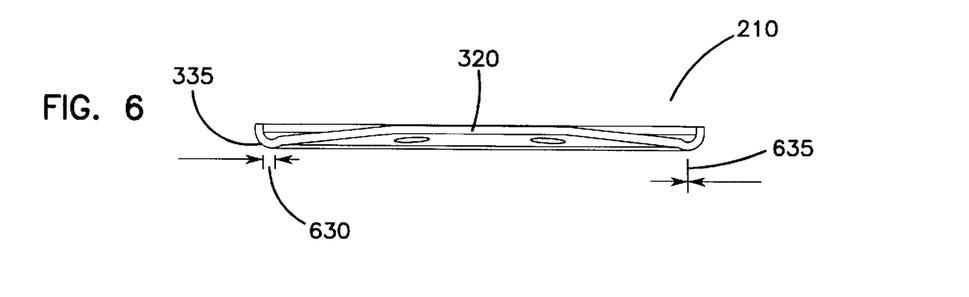
FIG. 6 is a cross sectional view of the disc clamp as in FIG. 3 after the lapping step and after reversal of the clamping force.

FIG. 6 shows the leaf spring disc clamp 210 after lapping and after the deflection force applied in the previous lapping step has been removed. Central leaf spring portion 320 can be seen in its undeflected position in which it is relatively further away from an imaginary line drawn across the bottom of the disc clamp 210. In comparison with FIG. 5, it can be seen that annular flat contact surface 335 appears narrower at location 635 than at location 535, since portions of annular flat contact surface 335 can twist or deflect from a planar position once the deflective force has been removed. It is intended that the annular flat contact surface 335 be as flat as possible when the disc 210 is installed. It may not be as flat when in an undeflected position.

When installed, the disc clamp 210 may not have a flat annular contact surface 335 that is entirely planar. The lapping process is preferably carried out while the disc clamp 210 is only partially deflected. Thus, while the resulting annular contact surface 335 would be even flatter if lapping took place while the clamp 210 was fully deflected, full deflection may structurally damage the clamp 210. When the clamp 210 is fully deflected (as installed), it undergoes plastic deformation. It is important that plastic deformation of the disc clamp 210 not occur until final installation. As a result, it is preferred that the disc clamp 210 be deflected to a position approximately halfway between an undeflected position and a fully deflected, installed position during lapping. This corresponds to a deflective force during lapping that is about 70 percent that of the force applied to the fully installed clamp 210.

Lapping can be accomplished in a variety of manners. A combination of lathe and mandrel can be used, although a lapping station is preferred. A lapping station includes a flat plane bearing an abrasive material suitable to remove small amounts of material from the spring disc clamp. The clamp can be made from a variety of materials, although stainless steel is preferred. The flat plane of the lapping station moves relative to the disc clamp 210. The flat plane can be square, circular or some other shape and can either vibrate, oscillate or rotate at a speed sufficient to remove material at a desirable rate. Alternatively, especially for low volume production, the lapping station could be stationary and the disc clamp 210 could be moved about on the abrasive surface. Preferably, only a small amount of material is removed from the annular contact surface. In a preferred embodiment, less than about 0.004 inches is removed. More preferably, the amount of material thickness removed is between about 0.001 inches and about 0.003 inches.

The following non-limiting example is intended only to illustrate one preferred embodiment of the invention.

WORKING EXAMPLE

Standard production stamped clamps were processed according to the following procedure:

Deflect clamp to a position approximately halfway between an undeflected position and a fully deflected (installed) position.

Remove a small amount of material (approximately 0.004 inches) from annular contact ring of clamp using a mandrel on a lathe.

Subsequent inspection under a microscope indicated that more material was removed from the annular contact ring in areas in radial alignment with the screw holes.

Five disc packs were assembled using the processed clamps, and five were assembled using unprocessed clamps. The average axial force was reduced by 15 to 20 percent in the disc packs using the processed disc clamps. Average flatness, which was measured at peak acceleration at an ID radius) was improved by about 70 percent. This roughly corresponds to the flatness of an unclamped disc.

Figure 7:
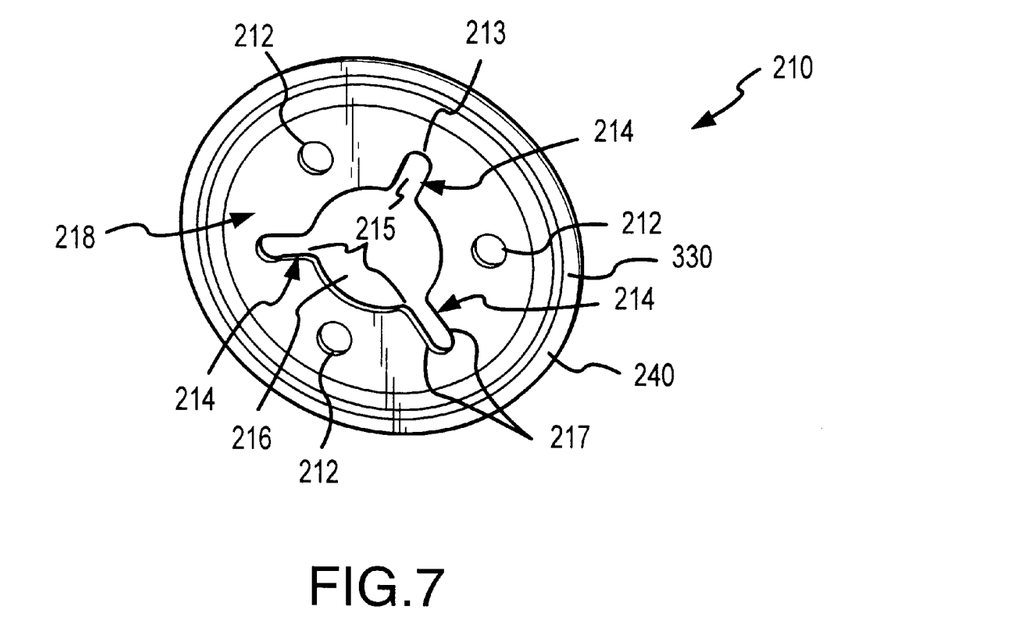
FIG. 7 is a top plan view of the disc clamp shown in FIG. 3.

Another aspect of the present invention is described below with reference to the plan view of the disc clamp 210 in FIG. 7. The disc clamp 210 is a generally circular disc shaped body having a central portion 218 and a peripheral annular rim portion 240 forming an annular rib 330. The central portion 218 has a central aperture 216 therethrough and screw mounting holes 212 equidistantly spaced around the central aperture 216 of the disc clamp 210. Although FIG. 7 shows three screw mounting holes 212, the disc clamp 210 may have three or more screw holes 212. The screw mounting holes 212 each receive a screw (not shown) to fasten the disc clamp 210 to the hub 230 of the spin motor 106. The disc clamp 210 further includes a slot, such as the spanner slots 214, between every two adjacent screw mounting holes 212 within the central portion 218 of the disc clamp 210. Each of the slots 214 has a closed end 213, an open end 215 that joins the central aperture 216, and has parallel sides 217 which form the generally rectangular shape of slots 214. The slots 214 serve the additional function of equalizing a clamping force exerted by the annular rib 330 against the disc 108, which reduces "potato chipping" of the disc 108. The slots 214 thereby improve the flatness of the disc 108. The slots 214 perform the equalizing function in two ways. First, the slots 214 reduce the magnitude of the peak to valley pressure fluctuations of the clamping force around the annular rib 330. Second, the slots 214 reduce the number of peak pressure fluctuations in the clamping force around the annular rib 330 of the disc clamp 210.

Figure 8:
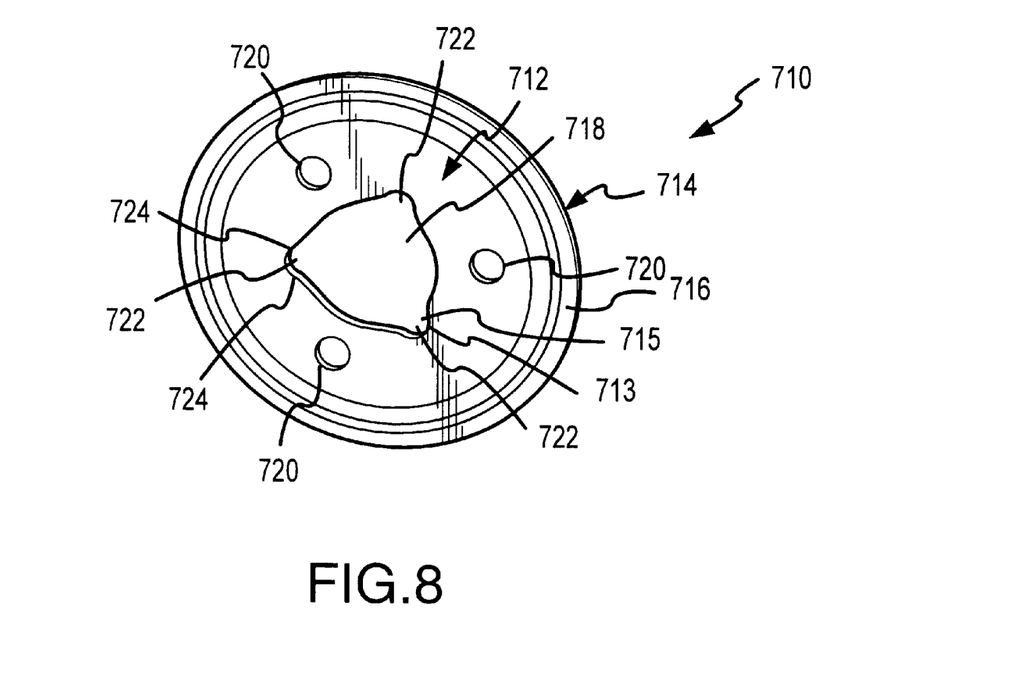
FIG. 8 is a top plan view of a disc clamp in accordance with another preferred embodiment of the present invention.

FIG. 8 shows a modified disc clamp 710 in accordance with yet another preferred embodiment of the present invention. Similar to disc clamp 210, disc clamp 710 is a generally circular disc shaped body having a central portion 712 and a peripheral annular rim portion 714 having annular rib 716. The central portion 712 has the central aperture 718 therethrough and three (or more) screw mounting holes 720 equidistantly spaced around the central aperture 718 of disc clamp 710. The screw mounting holes 720 each receive a screw (not shown) to fasten the disc clamp 710 to the hub 230 of the spin motor 106. Disc clamp 710 further includes a modified slot 722 between every two adjacent screw mounting holes 720 within the central portion 712 of the disc clamp 710. Each of the slots 722 has a closed end 713 and an open end 715 that joins the central aperture 718. However, instead of having parallel sides 217 like the slots 214, the slots 722 have diverging sides 724. FIG. 8 shows rounded diverging sides 724 forming the semi-circular slot shapes; however, the diverging sides 724 and the slots 722 may be of any shape. Disc clamp 710 may further include one or more guide pin holes (not shown) to assist in alignment of disc clamp 710 during the assembly process.

Both the slots 214 and the slots 722 redistribute the clamping force and thus make the clamping force exerted by the annular ribs 240 and 716 more uniform by reducing hoop stresses caused by the increased pressure located around the screws (not shown) within the screw mounting holes 212. The more the clamping force around the annular rib 240 is equalized, the more improved the flatness of the disc 108 will be.

In summary, the presently claimed invention may be viewed as a disc clamp (such as 210 and 710) for fastening a data storage disc (such as 108) to a hub (such as 230) of a spin motor (such as 106) in a disc drive (such as 100). The disc clamp (such as 210 and 710) has a generally circular disc shaped body having a central portion (such as 218 and 712) and a peripheral portion (such as 240 and 714). The central portion (such as 218 and 712) has a central aperture (such as 216 and 718) therethrough. A concentric annular rib (such as 330 and 716) is located on the peripheral portion (such as 240 and 714) for asserting a clamping force on the disc (such as 108). Three screw mounting holes (such as 212 and 720) in the central portion (such as 218 and 712) are equidistantly spaced around the central aperture (such as 216 and 718) for receiving screws to fasten the disc clamp (such as 210 and 710) to the hub (such as 230) of the spin motor (such as 106) thereby exerting the claming force to the disc (such as 108). A slot (such as 214 and 722) is formed in the central portion (such as 218 and 712) between every two adjacent screw mounting holes (such as 212 and 720) for equalizing the clamping force around the annular rib (such as 330 and 716) of the disc clamp (such as 210 and 710). Each slot (such as 214 and 722) has a closed end (such as 213 and 713) and an open end (such as 215 and 715) wherein the open end (such as 215 and 715) joins the central aperture (such as 216 and 718). Each of the slots (such as 214 and 722) may have parallel sides (such as 217) or diverging sides (such as 724). Each of the slots (such as 214 and 722) may have a generally rectangular shape or a generally semi-circular shape.

Stated another way, the presently claimed invention may be viewed as a method for equalizing a clamping force exerted by a disc clamp (such as 210 and 710) on a data storage disc (such as 108) supported on a hub (such as 230) of a spin motor (such as 106) in a disc drive (such as 100). A slot (such as 214 and 722) is provided in the central portion (such as 218 and 712) between every two adjacent screw mounting holes (such as 212 and 720). The disc clamp (such as 210 and 710) is loaded onto the hub (such as 230) of the spin motor (such as 106) such that the annular rib (such as 330 and 716) makes contact with the disc (such as 108). And the disc clamp (such as 210 and 710) is fastened to the hub (such as 230) of the spin motor (such as 106) with a screw through each of the screw mounting holes (such as 212 and 720) such that the annular rib (such as 330 and 716) exerts the clamping force onto the disc (such as 108).

It will be clear that the present invention is well adapted to attain the ends and advantages mentioned as well as those inherent therein. While a presently preferred embodiment has been described for purposes of this disclosure, numerous changes may be made which will readily suggest themselves to those skilled in the art and which are encompassed in the spirit of the invention disclosed and as defined in the appended claims.

What is claimed is:

1. A disc clamp for fastening a data storage disc to a hub of a spin motor in a disc drive, the disc clamp comprising:
   a generally circular disc shaped body having a central portion and a peripheral portion, the central portion having a central aperture therethrough;
   a concentric annular rib on the peripheral portion for asserting a clamping force on the disc;
   three screw mounting holes in the central portion equidistantly spaced around the central aperture for receiving screws to fasten the disc clamp to the hub of the spin motor thereby exerting the claming force to the disc; and
   a slot formed in the central portion between every two adjacent screw mounting holes for equalizing the clamping force around the annular rib of the disc clamp, each slot having a closed end and an open end wherein the open end joins the central aperture.

2. The disc clamp of claim 1 wherein each of the slots has parallel sides.

3. The disc clamp of claim 1 wherein each of the slots has diverging sides.

4. A method for equalizing a clamping force exerted by a disc clamp on a data storage disc supported on a hub of a spin motor in a disc drive, the disc clamp having a peripheral portion and a central portion, the peripheral portion having an annular rib around the central portion, the central portion having a central aperture therethrough and at least three screw mounting holes equidistantly spaced around the central aperture, the method comprising steps of:
   (a) providing a slot in the central portion between every two adjacent screw mounting holes, each slot having a closed end and an open end wherein the open end joins the central aperture for equalizing the clamping force around the annular rib of the disc clamp;
   (b) loading the disc clamp onto the hub of the spin motor such that the annular rib makes contact with the disc; and
   (c) fastening the disc clamp to the hub of the spin motor with a screw through each of the screw mounting holes such that the annular rib exerts the clamping force onto the disc.

5. The method of claim 4 wherein the providing step (a) comprises providing a slot with two parallel sides between the open end and the closed end.

6. The method of claim 4 wherein the providing step (a) comprises providing a slot with two diverging sides between the open end and the closed end.

7. The method of claim 4 wherein the providing step (a) comprises providing three of the slots in the central portion.

8. A disc drive comprising:

a base plate and a top cover enclosing a spin motor having a hub for carrying a data storage disc thereon;

a disc clamp for fastening the disc to the hub of the spin motor, the disc clamp having a peripheral portion and a central portion, the peripheral portion having an annular rib around the central portion, the central portion having a central aperture therethrough and three screw mounting holes equidistantly spaced around the central portion; and a slot formed in the central portion between every two adjacent screw mounting holes for equalizing the clamping force around the annular rib of the disc clamp, each slot having a closed end and an open end wherein the open end joins the central aperture.

9. The disc drive of claim 8 wherein each of the slots has a generally rectangular shape.

10. The disc drive of claim 8 wherein each of the slots has a generally semi-circular shape.

11. The disc drive of claim 8 wherein the central portion has three screw mounting holes equidistantly spaced around the central portion and three slots wherein each slot is located between every two adjacent screw mounting holes.

12. A disc drive comprising:

a head disc assembly having a base plate and a top cover enclosing a spin motor with a hub carrying a data storage disc thereon;

a disc clamp on the hub exerting a clamping force against the disc; and force equalizing means on the disc clamp for equalizing the clamping force exerted on the disc.

* * * * *

UNITED STATES PATENT AND TRADEMARK OFFICE
CERTIFICATE OF CORRECTION

PATENT NO.      : 6,483,661 B1
DATED           : November 19, 2002
INVENTOR(S)     : Martin et al.

It is certified that error appears in the above-identified patent and that said Letters Patent is hereby corrected as shown below:

Title page,
Insert [73], Assignee: -- Seagate Technology LLC -- .

Signed and Sealed this

Twenty ninth Day of April, 2003

JAMES E. ROGAN
*Director of the United States Patent and Trademark Office*